United States Patent
Shukla et al.

(10) Patent No.: US 11,914,990 B2
(45) Date of Patent: Feb. 27, 2024

(54) COMPUTING NODE UPGRADING SYSTEM

(71) Applicant: SAP SE, Walldorf (DE)

(72) Inventors: Hemant Kumar Shukla, Pune (IN); Tanay Jayant Kayastha, Pune (IN); Siddharth Kumar, Pune (IN); Nandan Marathe, Pune (IN)

(73) Assignee: SAP SE, Walldorf (DE)

( * ) Notice: Subject to any disclaimer, the term of this patent is extended or adjusted under 35 U.S.C. 154(b) by 56 days.

(21) Appl. No.: 17/528,620

(22) Filed: Nov. 17, 2021

(65) Prior Publication Data
US 2023/0153108 A1 May 18, 2023

(51) Int. Cl.
G06F 8/71 (2018.01)
G06F 8/65 (2018.01)
G06F 16/23 (2019.01)

(52) U.S. Cl.
CPC .............. G06F 8/71 (2013.01); G06F 8/65 (2013.01); G06F 16/2336 (2019.01); G06F 16/2358 (2019.01); G06F 16/2365 (2019.01); G06F 16/2379 (2019.01)

(58) Field of Classification Search
CPC .... G06F 8/71; G06F 16/2336; G06F 16/2379; G06F 16/2358; G06F 16/2365; G06F 8/65
USPC ......................................................... 717/171
See application file for complete search history.

(56) References Cited

U.S. PATENT DOCUMENTS

| 2016/0098443 A1* | 4/2016 | Specht ................... G06F 16/211 707/634 |
| 2016/0371356 A1* | 12/2016 | Lee ......................... G06F 16/273 |
| 2022/0382742 A1* | 12/2022 | Procek .................... G06F 9/4881 |

OTHER PUBLICATIONS

Neamtiu et al, "Cloud Software Upgrades: Challenges and Opportunities", 2011, [Online], pp. 1-10, [Retrieved from internet on May 19, 2023], <https://ieeexplore.ieee.org/stamp/stamp.jsp?arnumber=6049037> (Year: 2011).*
Ajmani et al., "Modular Software Upgrades for Distributed Systems", 2006, [Online], pp. 452-476, [Retrieved from internet], <https://link.springer.com/chapter/10.1007/11785477_26> (Year: 2006).*
Brewer, E.A., "Lessons from giant-scale services," IEEE Internet Computing, vol. 5, No. 4, pp. 46-55, 2001.
Dumitras, T., and P. Narasimhan, "Why do upgrades fail and what can we do about it?" ACM/IFIP/USENIX International Conference on Distributed Systems Platforms and Open Distributed Processing, Springer, pp. 349-372, 2009.

(Continued)

Primary Examiner — S. Sough
Assistant Examiner — Zengpu Wei
(74) Attorney, Agent, or Firm — Sterne, Kessler, Goldstein & Fox P.L.L.C.

(57) ABSTRACT

Disclosed herein are various embodiments a code simplification system. An embodiment operates by determining that a software version of a coordinator node is different from a software version of one or more worker nodes, Commits by the one or more worker nodes to a database are disabled based on the determination that the software versions differ. An update is performed on each of the one or more worker nodes. An acknowledgement that the update on each of the one or more worker nodes has completed is received, and the commits to the database by the one or more worker nodes is enabled.

20 Claims, 5 Drawing Sheets

(56) References Cited

OTHER PUBLICATIONS

"Use the Always On pattern to achieve zero downtime during outages," downloaded from https://www.ibm.com/cloud/architecture/architecture/practices/achieve-zero-downtime/, 5 pages, printed Sep. 11, 2023.
"Zero Downtime Database Upgrade Using Oracle GoldenGate," Oracle White Paper, downloaded from https://www.oracle.com/technetwork/middleware/goldengate/overview/ggzerodowntimedatabaseupgrades-174928.pdf, 19 pages, Aug. 2015.

* cited by examiner

COMPUTING NODE UPGRADING SYSTEM

BACKGROUND

Maintaining computing uptime is important in any computing system. However, an important part of maintaining any computing system is performing occasional upgrades to the computing devices, including the software installed thereon. Oftentimes, during these upgrades, computing devices need to be taken down or offline which often renders the system unavailable to users during the time it takes to complete the upgrade, and which may both interfere with maintaining continuous uptime and may have adverse financial, computing, and other implications.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Maintaining computing uptime is important in any computing system. However, an important part of maintaining any computing system is performing occasional upgrades to the computing devices, including the software installed thereon. Oftentimes, during these upgrades, computing devices need to be taken down or offline which often renders the system unavailable to users during the time it takes to complete the upgrade, and which may both interfere with maintaining continuous uptime and may have adverse financial, computing, and other implications.

Figure 1:
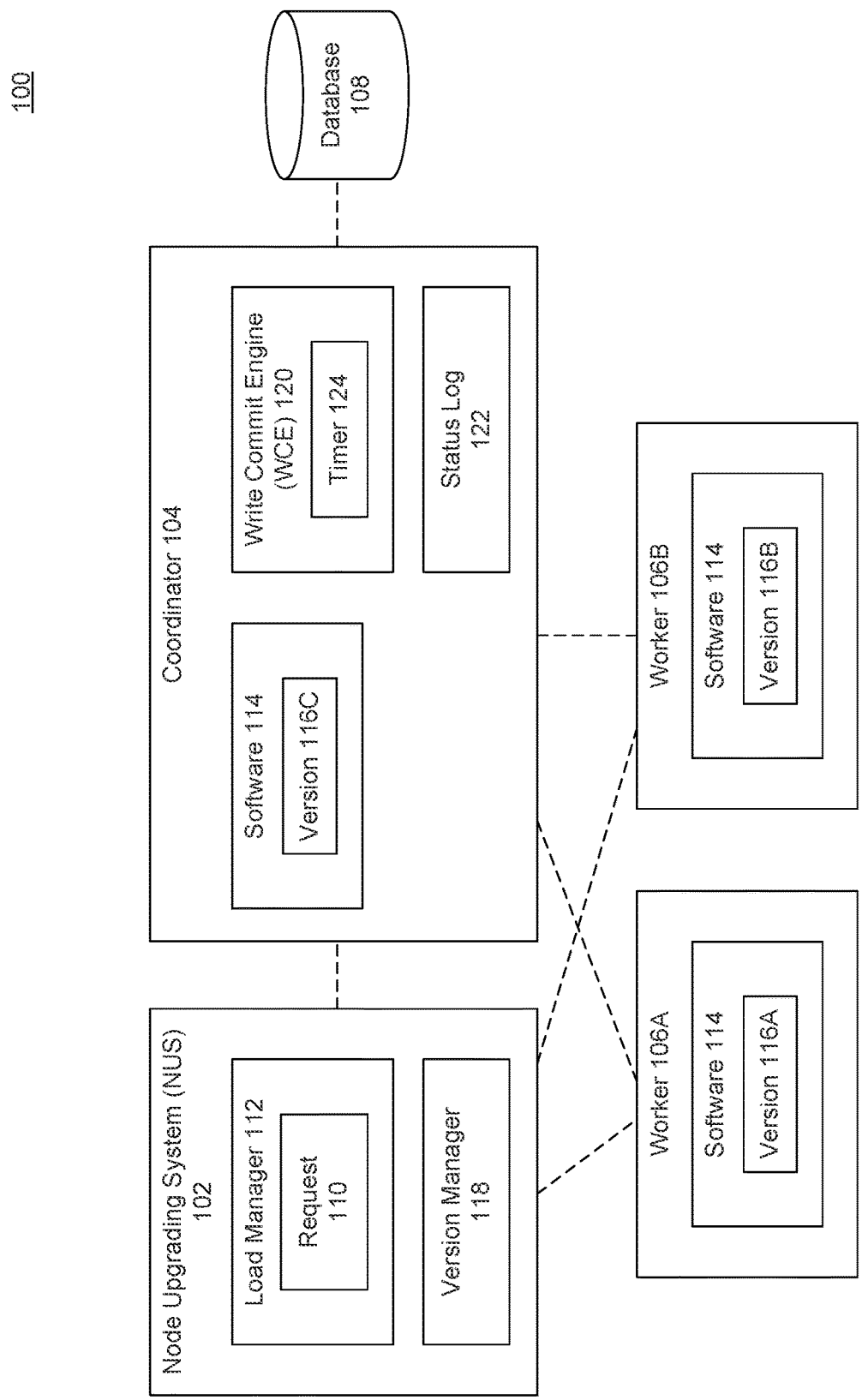
FIG. 1 is a block diagram illustrating functionality for a node upgrading system (NUS), according to some example embodiments.

FIG. 1 is a block diagram 100 illustrating functionality for a node upgrading system (NUS) 102, according to some example embodiments. NUS 102 may help manage updates or upgrades to various nodes (e.g., processors or computing devices) of a computing system in a manner that increases or maximizes uptime and/or runtime functionality during the upgrade.

The example of FIG. 1 illustrates a computing system with three nodes: a coordinator 104 and two workers 106A, 106B (referred to generally as workers 106). It is understood that other systems may include multiple coordinators 104 and different numbers of workers 106, and that a coordinator 104 may also perform the read/write functionality of a worker 106. Coordinator 104 and workers 106 may be part of a distributed system, in which workers 106 can read data from and write data to a database 108. Database 108 may be a column-oriented, or row-oriented database, or another data storage and retrieval system.

In some embodiments, while workers 106 may read data directly from database 108, write commands (e.g., for updating, writing, changing, adding, deleting data) may be managed by coordinator 104. For example, when a worker 106 wants to write data to database 108, the worker 106 may request a semaphore or lock from coordinator 104. The worker 106 may be prevented from writing data until the requested lock is granted.

In some embodiments, any locks(s) on database 108 to perform write commands may be issued on a first-in, first-out, or sequential basis by a write commit engine (WCE) 120. While the lock is being used to perform or commit a first write command, WCE 120 may queue subsequent write commands or requests. Then when the lock is released, WCE 102 may grant the lock to the next waiting write command. Once the lock is granted, the worker 106 may update the database 108 per the write command(s) (e.g., delete, update, add). In some embodiments, different tables of database 108 may each have their own locks, enabling different nodes or workers 106 to simultaneously write to different tables with different locks.

In some embodiments, the various nodes of the computing system may maintain their own snapshots of data of database 108, from which they can process read commands and perform write commands. However, as noted above, the write commands are not committed until they are actually written to the database 108 (e.g., after receiving a lock from WCE 120). In some embodiments, when the database 108 is updated by any of the nodes, a new snapshot of the data may be generated and provided to the various workers 106. In some embodiments, table-level snapshots of the data may be taken and distributed or otherwise made available to workers 106 when any data of a particular table is updated.

This locking and snapshot distribution mechanism of WCE 120 may help maintain data consistency amongst various worker nodes 106 by preventing write collisions on database 108 (e.g., two nodes trying to write to the same data simultaneously). The workers 106 may use their data snapshots to respond to or process any read requests they have received or be responsible for handling. In some embodiments, each worker 106 may maintain its own snapshot of the data across each of the various tables of database 108 that it needs to or has access. These snapshots may be updated periodically (e.g., every 30 seconds), or when the data or a particular table has been updated, or when a new transaction starts on any worker node 106.

In some embodiments, the computing system described herein including a coordinator 104 and several workers 106 may be part of a cloud platform that is configured to handle, process, and respond to requests 110 from a multitude of different clients (not shown). Request 110 may include read or write requests received from one or more clients. In a cloud computing system embodiment, the various workers 106 may be identically configured to help provide persistency amongst the nodes in case of node failures or other events that cause one or more of the nodes to go offline or operate with reduced functionality or availability.

This persistency and similarity of node configuration may enable a load manager 112 to manage the workloads of nodes, by distributing requests 110 across the various nodes of the computing system. For example, if one worker 106A is taken offline or is operating with reduced functionality or an increased workload, load manager 112 may redirect requests 110 to other worker(s) 106B that are still available or that have greater available processing bandwidth. In some embodiments, load manager 112 may coordinate with coordinator 104 to determine how to distribute the requests 110.

In some embodiments, requests 110 may be received by load manager 112 and distributed to workers 106. In other embodiments, requests 110 may be received directly by various workers 106. Though load manager 112 is illustrated as being located on NUS 102, in other embodiments, load manager 112 may be a standalone computing device or integrated with coordinator 104 or another node.

In some embodiments, the various nodes may each include software 114 of a particular version 116. The software 114 may include software or a computing program(s) that is used to interact with database 108, and perform read or write commands or perform other data processing, storage, and/or retrieval commands. The nodes may occasionally be updated to improve persistency, which may include adding or replacing node hardware, firmware, and/or updating or changing their software 114, which may include operating system upgrades.

Performing these node updates, particularly software updates, often requires taking the entire system of nodes offline to prevent different nodes from operating different versions 116 of the same software 114 which could create data inconsistencies and other unexpected problems. This system downtime may be problematic for any clients requesting read or writes to be performed during the upgrade time. NUS 102 addresses these and other issues that may arise during a system or node (software) upgrade process.

As just referenced, node software 114 may occasionally be updated. These updates may include adding new features, fixing bugs, improving processing speeds or computing performance, changing node communications through the software, etc. In some embodiments, the updates may include installing new software or plugins, or deleting or removing existing software from the nodes. In some embodiments, each update or change of software 114 (e.g., update, addition, or removal) may result in a new version 116.

For the sake of simplicity, the primary example described herein will refer to an existing software package or software suite 114 that is being upgraded to a new version 116, with new features, bug fixes, etc. Each software update may result in a new version 116 with a new version number or release number identifying a particular software package. In other embodiments, version 116 may include a list of which software packages and their respective versions are currently installed or active on a particular node. In some embodiments, version 116 may indicate a date when the software package(s) of a particular node was previously updated or upgraded.

To help maintain or protect data consistency, it is desirable that the various versions 116 of software 114 across all the nodes 104, 106A, 106B be consistent, the same, or identical. Oftentimes, upgrading the software 114 to a new version 116 will require taking down or offline all of the nodes 104, 106A, 106B of the system, while the upgrades are being performed. While this downtime may preserve data consistency during the upgrade process, this downtime can also have other adverse consequences. For example, if all the nodes are taken offline during the upgrade, then no requests 110 can be performed while the system is down, which may result in customer dissatisfaction, lost revenue or productivity, processing backups and delays when the system is restarted, and other undesirable effects.

Rather than requiring a complete system takedown, NUS 102 may enable various nodes of the system to remain functional while the software 114 across the nodes 104, 106A, 106B is being upgraded from a first version 116 to a second version 116. While described herein primarily with respect to performing software updates, it is understood that the system of upgrading described herein may apply regardless of whether a hardware, firmware, or software update or upgrade is being performed across the different nodes of a computing system.

In some embodiments, a version manager 118 may manage software versioning or upgrades across the nodes 104, 106A, 106B of the system. Version manager 118 may track the current version numbers and types of software packages installed and/or that are operational across the various nodes, and initiate and coordinate the upgrades the nodes in the various embodiments described herein.

In some embodiments, version manager 118 may receive a notification or be notified that there is a new upgrade or version 116 of the software 114 to be installed on the nodes (or a subset of the nodes). As described above, this software upgrade may include installing new software (e.g., including a plugin), removing existing software, or upgrading existing software, any of which is referred to as a new version 116.

In some embodiments, the software upgrade may include updating a catalog and/or snapshot of data that may be stored or maintained by each node 104, 106A, 106B. The catalog may include metadata about the database 108, and the snapshot may include the various data values of database. And when the software 114 is upgraded, the catalogs and/or snapshots may also be updated (if needed).

In some embodiments, version manager 118 may begin with upgrading the software 114 of coordinator 104. During the upgrade of coordinator 104, NUS 102 may disable or temporarily take down or offline coordinator 104, including WCE 120. For example, NUS 102 may send an offline or upgrade message to coordinator 104 which may cause coordinator 104 to disable one or more processes, such as WCE 120. As a result of WCE 120 may be temporarily be disabled during the upgrade of coordinator 104.

During this downtime of WCE 120, workers 106 may be prevented from committing changes (e.g., write commands) to database 108 or otherwise be unable to commit their changes. In some embodiments, write requests 110 received by load manager 112 during the WCE 120 downtime may be discarded, ignored, or logged/queued for later processing. Or, for example, write requests received by coordinator 104 from workers 106 (which may remain functional during the upgrade of coordinator 104), or coordinator 104 itself, may be discarded or ignored. However, workers 106 may continue processing read requests from database 108 or by using their own stored snapshots of data.

In some embodiments, the upgrade of software 114 may require a reboot of coordinator 104. When the new version 116 of software 114 has been successfully installed on coordinator 104, coordinator 104 may send an acknowledgment message to version manager 118, which may then begin or initiate an upgrade of the software 114 of a next node.

Upon the reboot or restart of coordinator 104 after a successful upgrade, the version 116C of software 114 on coordinator 104 may be different from the versions 116A, 116B of software 114 on workers 106A, 106B. Having different versions 116A-C of software 114 operational across different nodes may create consistency errors with regard to write commands. As such, to avoid such consistency errors, version manager 118 may temporarily disable (or keep disabled) the WCE 120. Disabling WCE 120 (or continuing the maintain the disabled state of WCE 120) may prevent any write commands from workers 106A, 106B and coordinator 104 from being committed to database 108 while the workers 106 have different versions 116A, 116B from the version 116C of coordinator 104.

Upon completion of the upgrade of software 114 of coordinator 104 to version 116C, version manager 118 may select another node (e.g., a worker 106) to upgrade. For example, version manager 118 may maintain a list of the different workers 106 and may select one of the non-upgraded workers 106 from the list, such as worker 106B.

During the upgrade of worker 106B, worker 106B may be temporarily disabled or taken offline. During this downtime of worker 106B, load manager 112 may route any new read requests 110 to any remaining or available worker nodes (e.g., worker 106A). In some embodiments, version manager 118 may upgrade or initiate the update of multiple workers 106 simultaneously if it is determined that there are enough remaining (online) workers 106 to handle the workload that may be or that may be predicted to be received during the multiple node upgrade or update process. In some embodiments, coordinator 104 may be available to process read requests 110 while WCE 120 is disabled or offline, during the upgrade process.

As noted above, in some embodiments, coordinator 104 may ignore or discard write requests 110 received from workers 106 while WCE 120 remains offline. However, in some embodiments, coordinator 104 may itself process and perform write requests after its been upgraded and while various worker nodes of the system are being upgraded and unavailable for write processing. In some embodiments, coordinator 104 may ignore any write requests received from workers 106 whose software version is different from version 116C but WCE 120 may be enabled to process write requests from workers 106 whose software versions 116 have already been upgraded.

In some embodiments, coordinator 104 may maintain a status log 122. Status log 122 may track the online, offline, upgrade, or operational statuses of the various workers 106A, 106B. As such, while worker 106B is offline, status log 122 may reflect that the only online, available node is worker 106A. In some embodiments, status log 122 may be updated by version manager 118 to track which workers 106 have been upgraded, are being upgraded, and/or are awaiting upgrade.

Once the software 114 of worker 106B has upgraded to a new version 116B and worker 106B is back online, version manager 118 may be notified and may update status log 122 and notify coordinator 104. Version manager 118 may then select the next worker 106A to upgrade and take offline.

In some embodiments, worker 106B may be enabled to perform write requests once version 116B matches version 116C. In some embodiments, load manager 112 may direct incoming write requests 110 only to upgraded workers 106. Once the final worker 106 has been upgraded, version manager 118 may enable WCE 120 to operate for all nodes, and load manager 112 may distribute read and write requests 110 amongst all the available (upgraded) nodes again. In other embodiments, all write requests 110 may be suspended, logged, queued, or ignored until all of the nodes of the system are operating on the new version 116 of software 114, or upon the expiration of a timer 124.

In some embodiments, WCE 120 may include a timer 124. Timer 124 may automatically reactivate WCE 120 after a set period of time, even if there are workers 106 with older versions 116 of software 114 that have not yet been upgraded. In some embodiments, this reactivation of WCE 120 may be for only those nodes or workers 106 that have been upgraded, while in other embodiments, the reactivation may allow all workers 106 to process and commit write requests 110 again. Timer 124 may prevent extended system downtimes in case of upgrade failures or other hang ups which may cause the upgrade to take an extended or longer than anticipated period of time, which may affect system uptime and throughput.

In some embodiments, upon expiration of timer 124, previously upgraded nodes may be rolled back to previous software versions to ensure or maintain consistency across the versions 116A-C, and a system administrator may be notified of the failure (e.g., which nodes were successfully upgraded and rolled back, and which node(s) encountered upgrade failures).

In some embodiments, if there is only one worker node 106A and a coordinator 104 in a particular computing system, a system administrator or version manager 118 may activate a second, temporary worker node 106B prior to or after updating coordinator 104. The second worker node 106B may include the same configuration and software version 116B as the identified worker 106A or may include the same configuration as the identified worker 106A and upgraded software version 116B. Then, for example, version manager 118 may upgrade coordinator 104 and worker 106A. And while worker 106A is being upgraded, temporary worker 106B may manage or process read requests 110, thus helping save system uptime and increase system throughput. Then, for example, when worker 106A has successfully upgraded, the temporary worker node 106B may be disabled and the resources reallocated.

Figure 2:
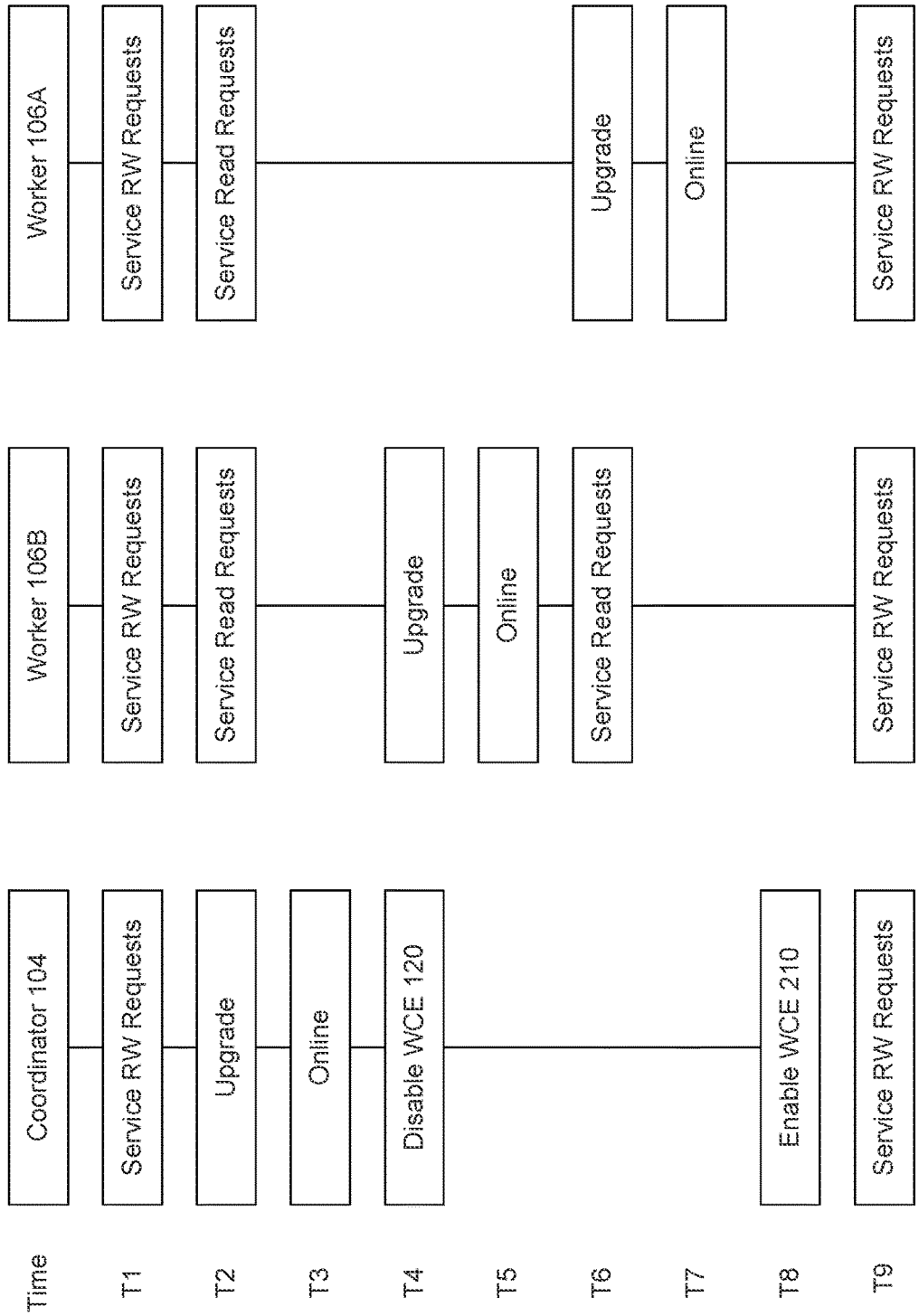
FIG. 2 is a time-based block diagram illustrating functionality for a node upgrading system (NUS), according to some example embodiments.

FIG. 2 is a time-based block diagram 200 illustrating functionality for a node upgrading system (NUS) 102, according to some example embodiments. At time T1, the coordinator 104, worker 106A, and worker 106B may all be available for processing read and write requests to a database 108. These various nodes may all include or may be operating the same version 116 of software 114.

At time T2, the software 114 of coordinator 104 may be upgraded. During T2 while coordinator 104 is being upgraded, WCE 120 may become or made unavailable, and as a result, workers 106A and 106B may only process or service read only requests. Any write requests received during time T2 may either be ignored or fail due to the unavailability of WCE 120.

Version manager 118 may ping, receive an acknowledgement from, or otherwise detect when a node has completed its upgrade process. At time T3, coordinator 104 may be detected as being back online and available with a new version 116 of software 114. However, this may result in an inconsistency between the versions 116A, 116B and version 116C.

As such, before any write requests can be processed, at time T4, WCE 120 may be disabled to avoid any issues that may arise due to the version inconsistencies. In other embodiments, WCE 120 may be disabled at time T2, prior to or as part of the upgrade process. In some embodiments, at time T4, WCE 120 may only be disabled for workers who have not yet completed upgrading to the new version 116 of software 114, but may be enabled for coordinator 104 and any upgraded nodes or workers 106.

At time T4, the software 114 of worker 106B may be upgraded. During this time, any read requests may be handled exclusively by worker 106A, which may remain online. For example, load manager 112 may route any incoming requests 110 to any available nodes that may be online during the system upgrade process. In some embodiments, load manager 112 may automatically discard or ignore any or all incoming write requests 110 that are received while WCE 120 is offline (e.g., and the nodes of the system are being upgraded). In other embodiments, load manager 112 may route write requests 110 to be performed by coordinator 104 while one or more workers 106 are being upgraded or there is version inconsistency between the software 114 of workers 106 and coordinator 104.

At time T5, worker 106B may be back online, and at time T6, worker 106B may begin servicing read requests again. At time T6, worker 106A may then begin its upgrade process. In some embodiments, if worker 106A is currently processing a read request, then the system may wait until the current read requests (and/or any queued read requests for worker 106A) are processed before beginning the upgrade process and taking worker 106A offline.

At time T7, worker 106A come back online after upgrade. At time T8, WCE 120 may be re-enabled for all workers 106. At time T9, the system may be back online, processing both read and write requests with the updated software 114 or upgraded nodes.

Figure 3:
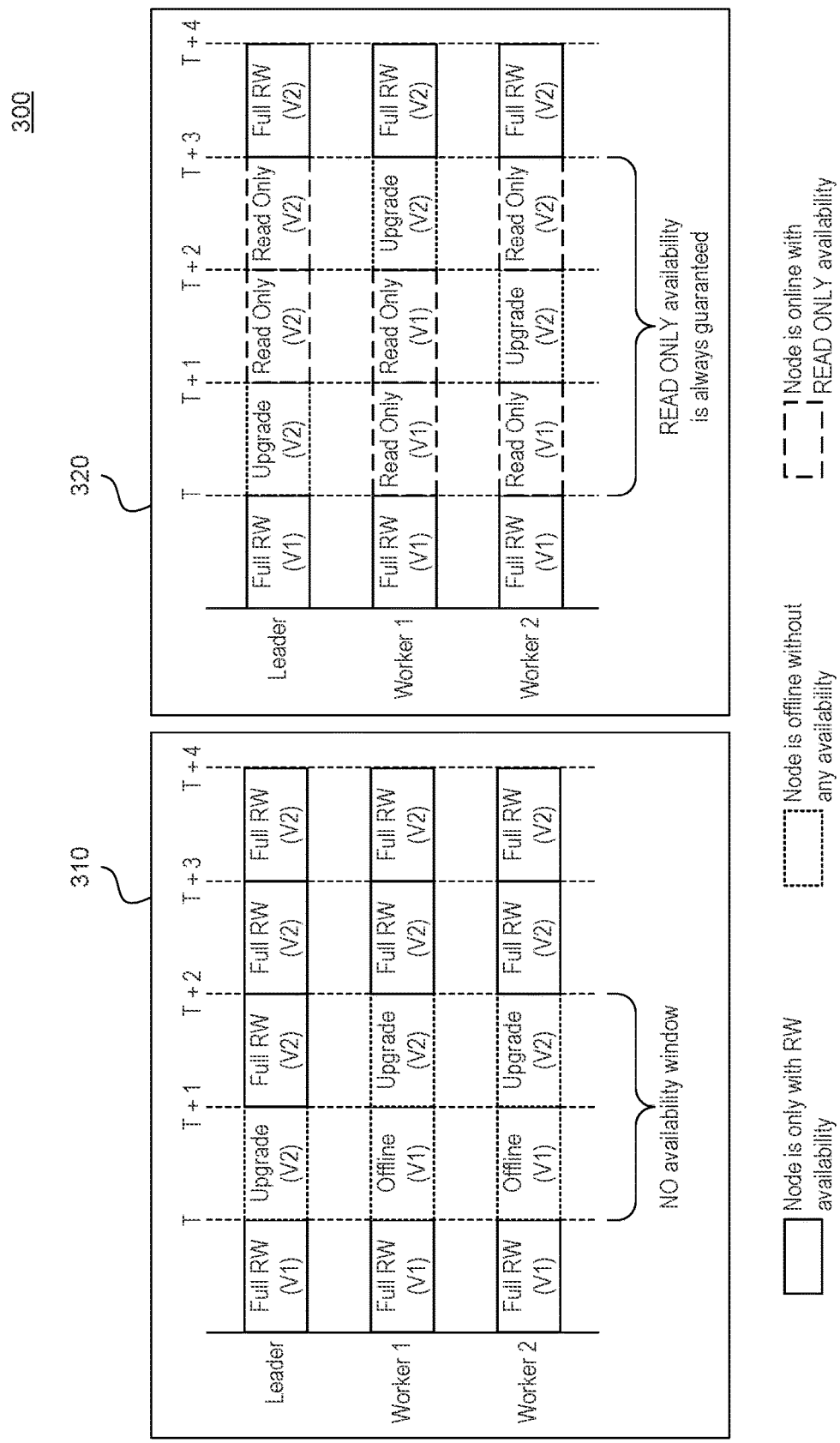
FIG. 3 is a block diagram illustrating which nodes are online and offline during an upgrade process, according to some example embodiments.

FIG. 3 is a block diagram 300 illustrating which nodes are online and offline during an upgrade process, according to some example embodiments. Box 310 illustrates an example upgrade process (e.g., without NUS 102). Box 320 illustrates an example upgrade process as may be performed or managed by NUS 102.

As illustrated in box 310, upgrading the nodes of a computing system without NUS 102 may require full system downtime from time T to T+1, during which a leader or coordinator node may be upgraded and no read or write requests may be performed by any node. Then, from T+1 to T+2, both worker 1 and worker 2 may remain offline as they are being upgraded.

By contrast, as illustrated in box 320, with NUS 102, there is no full system downtime, and some subset of nodes are always available and operational. While the leader or coordinator 104 is being upgraded from T to T+1, the workers may remain available to perform read requests. And while worker 2 is being upgraded at time T+1 to T+2, worker 1 may remaining available for read requests. Similarly, at time T+2 to T+3, as worker 1 is being upgraded, worker 2 is made available again for read requests. As illustrated, there are always two or more nodes available to perform at least read only requests.

Figure 4:
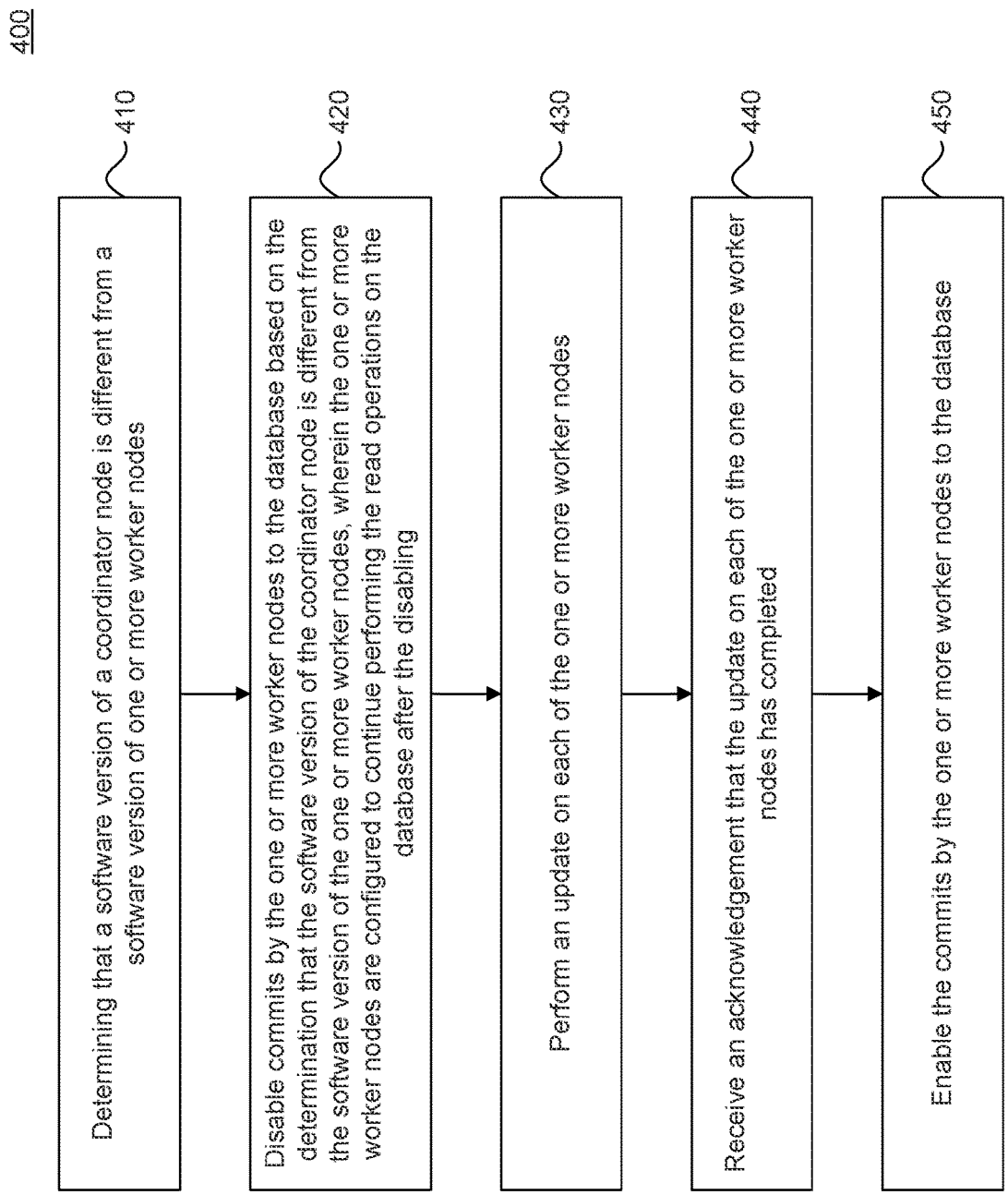
FIG. 4 is a flowchart illustrating example operations for functionality for a node upgrading system (NUS), according to some embodiments.

FIG. 4 is a flowchart 400 illustrating example operations for functionality for a node upgrading system (NUS) 102, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to the figures.

At 410, it is determined that a software version of a coordinator node is different from a software version of one or more worker nodes. For example, version manager 118 may determine that the software 114 of coordinator 104, worker 106A, and worker 106B need to be updated. Initially, the versions 116A-C may all be identical. However, after an upgrade to coordinator 104, version 116C may be different from versions 116A, 116B.

At 420, commits by the one or more worker nodes to the database are disabled based on the determination that the software version of the coordinator node is different from the software version of the one or more worker nodes. For example, NUS 102 may disable WCE 120 of coordinator 104 while there are variances between versions 116, 116B, and 116C. WCE 120 may be responsible for coordinating write commands to database 108.

As such, while WCE 120 is disabled or offline, workers 106A, 106B may no longer be able to write or commit writes to database 108. However, workers 106A, 106B may continue to process read requests 110. In some embodiments, workers 106A, 106B may process the read requests using their own stored versions of data from the database 108 (e.g., snapshots of database 108).

At 430, an update is performed on each of the one or more worker nodes, wherein the update comprises updating a software of each of the one or more worker nodes. For example, NUS 102 may perform rolling updates on workers 106A and 106B to update the software 114, and continue this process until versions 116A and 116B are once again identical to version 116C.

At 440, an acknowledgement is received that the update on each of the one or more worker nodes has completed. For example, coordinator 104 may maintain a status log 122 that tracks or monitors a status of the various workers 106A, 106B. As the software 114 of each node is upgraded, the node may transmit an acknowledgement message (e.g., which may indicate the active version 116) when it is ready to perform processing again.

At 450, the commits by the one or more worker nodes is enabled to the database. For example, once version manager 118 detects that all the versions 116A-C are identical, WCE 120 may be re-enabled or brought back online, and write processing may continue with the new version of software 114.

Figure 5:
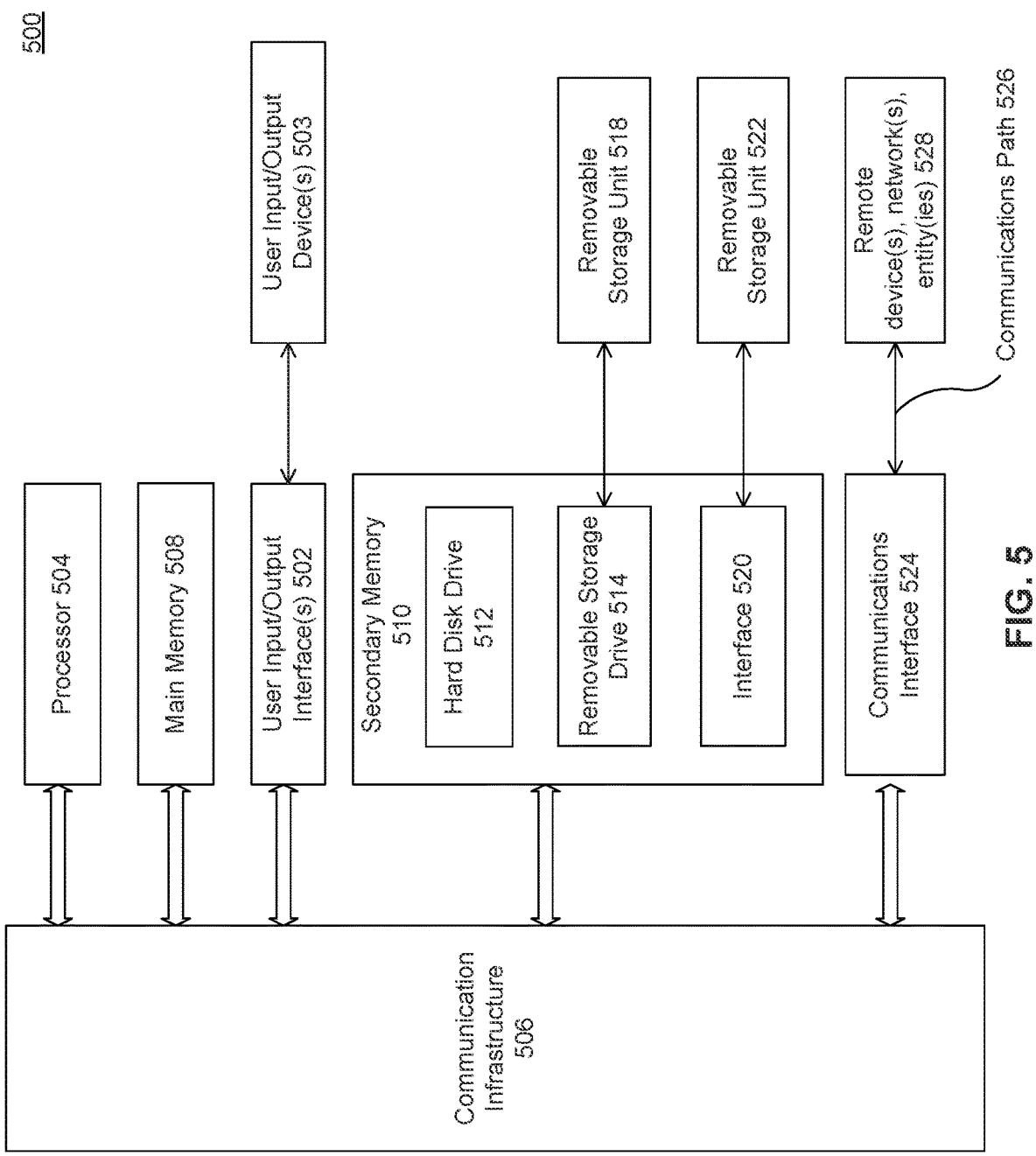
FIG. 5 is an example computer system useful for implementing various embodiments.

Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof.

Computer system 500 may include one or more processors (also called central processing units, or CPUs), such as a processor 504. Processor 504 may be connected to a communication infrastructure or bus 506.

Computer system 500 may also include customer input/output device(s) 503, such as monitors, keyboards, pointing devices, etc., which may communicate with communication infrastructure 506 through customer input/output interface(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random-access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 may include a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to removable storage unit 518.

Secondary memory 510 may include other means, devices, components, instrumentalities or other approaches for allowing computer programs and/or other instructions and/or data to be accessed by computer system 500. Such means, devices, components, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 500 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "some embodiments" "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected"

and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining that a software version of a coordinator node is different from a software version of one or more worker nodes, wherein the coordinator node is configured to coordinate write operations by the one or more worker nodes on a database, and wherein the one or more worker nodes are configured to perform both read operations and the write operations on the database;
   disabling commits by the one or more worker nodes to the database based on the determination that the software version of the coordinator node is different from the software version of the one or more worker nodes, wherein the one or more worker nodes are configured to continue performing the read operations on the database after the disabling;
   performing an update on each of the one or more worker nodes, wherein the update comprises updating a software of each of the one or more worker nodes, wherein the software version of a first worker node of the one or more worker nodes is identical to the software version of the coordinator node after a completion of the update;
   receiving, at the coordinator node, an acknowledgement that the update on each of the one or more worker nodes has completed, wherein the acknowledgement indicates that the software version of each of the one or more worker nodes is identical to the software version of the coordinator node; and
   enabling the commits by the one or more worker nodes to the database, responsive to receiving the acknowledgment.

2. The method of claim 1, wherein the determining comprises:
   determining that a software of the coordinator node has been upgraded, wherein prior to the upgrade, the software version of the coordinator node was identical to the software version of the one or more worker nodes prior to the disabling.

3. The method of claim 1, wherein the performing comprises:
   performing rolling updates on each of the one or more worker nodes, wherein the rolling updates sequentially update the one or more worker nodes, and wherein each worker node is disabled from performing the read operations during its update.

4. The method of claim 3, wherein the performing rolling updates comprises:
   determining that a first update on the first worker node has completed;
   identifying a second worker node of the one or more worker nodes on which to perform a second update;
   determining that the second worker node is performing a second read operation;
   discontinuing the second read operation at the second worker node; and
   performing the second update on the second worker node.

5. The method of claim 3, wherein the performing rolling updates comprises:
   determining that a first update on the first worker node has completed;
   identifying a second worker node of the one or more worker nodes on which to perform a second update;
   determining that the second worker node is performing a second read operation;
   waiting until the second read operation at the second worker node has completed; and
   performing the second update on the second worker node after the completion of the read operation at the second worker node.

6. The method of claim 1, further comprising:
   determining that the first worker node is an only one worker node of the one or more worker nodes, prior to determining that the software version of the coordinator node is different from the software version of the only one worker node;
   activating a second worker node, wherein the coordinator node is configured to coordinate the write operations of both the first worker node and the second worker node; and
   updating a software of the coordinator node, wherein after the updating, the software version of the coordinator node is different from the software version of both the first worker node and the second worker node.

7. The method of claim 6, further comprising:
   disabling the second worker node after the activating.

8. A system, comprising:
   a memory; and
   at least one processor coupled to the memory and configured to perform instructions that cause the at least one processor to perform operations comprising:
      determining that a software version of a coordinator node is different from a software version of one or more worker nodes, wherein the coordinator node is configured to coordinate write operations by the one or more worker nodes on a database, and wherein the one or more worker nodes are configured to perform both read operations and the write operations on the database;
      disabling commits by the one or more worker nodes to the database based on the determination that the software version of the coordinator node is different from the software version of the one or more worker nodes, wherein the one or more worker nodes are configured to continue performing the read operations on the database after the disabling;
      performing an update on each of the one or more worker nodes, wherein the update comprises updating a software of each of the one or more worker nodes, wherein the software version of a first worker node of the one or more worker nodes is identical to the software version of the coordinator node after a completion of the update;
      receiving, at the coordinator node, an acknowledgement that the update on each of the one or more worker nodes has completed, wherein the acknowledgement indicates that the software version of each of the one or more worker nodes is identical to the software version of the coordinator node; and
      enabling the commits by the one or more worker nodes to the database, responsive to receiving the acknowledgment.

9. The system of claim 8, wherein the determining comprises:
   determining that a software of the coordinator node has been upgraded, wherein prior to the upgrade, the software version of the coordinator node was identical to the software version of the one or more worker nodes prior to the disabling.

10. The system of claim 8, wherein the performing comprises:
   performing rolling updates on each of the one or more worker nodes, wherein the rolling updates sequentially update the one or more worker nodes, and wherein each worker node is disabled from performing the read operations during its update.

11. The system of claim 10, wherein the performing rolling updates comprises:
   determining that a first update on the first worker node has completed;
   identifying a second worker node of the one or more worker nodes on which to perform a second update;
   determining that the second worker node is performing a second read operation;
   discontinuing the second read operation at the second worker node; and
   performing the second update on the second worker node.

12. The system of claim 10, wherein the performing rolling updates comprises:
   determining that a first update on the first worker node has completed;
   identifying a second worker node of the one or more worker nodes on which to perform a second update;
   determining that the second worker node is performing a second read operation;
   waiting until the second read operation at the second worker node has completed; and
   performing the second update on the second worker node after the completion of the read operation at the second worker node.

13. The system of claim 8, the operations further comprising:
   determining that the first worker node is an only one worker node of the one or more worker nodes, prior to determining that the software version of the coordinator node is different from the software version of the only one worker node;
   activating a second worker node, wherein the coordinator node is configured to coordinate the write operations of both the first worker node and the second worker node; and
   updating a software of the coordinator node, wherein after the updating the software version of the coordinator node is different from the software version of both the first worker node and the second worker node.

14. The system of claim 13, the operations further comprising:
   disabling the second worker node after the activating.

15. A non-transitory computer-readable medium having instructions stored thereon that, when executed by at least one computing device, cause the at least one computing device to perform operations comprising:
   determining that a software version of a coordinator node is different from a software version of one or more worker nodes, wherein the coordinator node is configured to coordinate write operations by the one or more worker nodes on a database, and wherein the one or more worker nodes are configured to perform both read operations and the write operations on the database;
   disabling commits by the one or more worker nodes to the database based on the determination that the software version of the coordinator node is different from the software version of the one or more worker nodes, wherein the one or more worker nodes are configured to continue performing the read operations on the database after the disabling;
   performing an update on each of the one or more worker nodes, wherein the update comprises updating a software of each of the one or more worker nodes, wherein the software version of a first worker node of the one or more worker nodes is identical to the software version of the coordinator node after a completion of the update;
   receiving, at the coordinator node, an acknowledgement that the update on each of the one or more worker nodes has completed, wherein the acknowledgement indicates that the software version of each of the one or more worker nodes is identical to the software version of the coordinator node; and
   enabling the commits by the one or more worker nodes to the database, responsive to receiving the acknowledgment.

16. The non-transitory computer-readable medium of claim 15, wherein the determining comprises:
   determining that a software of the coordinator node has been upgraded, wherein prior to the upgrade the software version of the coordinator node was identical to the software version of the one or more worker nodes prior to the disabling.

17. The non-transitory computer-readable medium of claim 15, wherein the performing comprises:
   performing rolling updates on each of the one or more worker nodes, wherein the rolling updates sequentially update the one or more worker nodes, and wherein each worker node is disabled from performing read operations during its update.

18. The non-transitory computer-readable medium of claim 17, wherein the performing rolling updates comprises:
   determining that a first update on the first worker node has completed;
   identifying a second worker node of the one or more worker nodes on which to perform a second update;
   determining that the second worker node is performing a second read operation;
   discontinuing the second read operation at the second worker node; and
   performing the second update on the second worker node.

19. The non-transitory computer-readable medium of claim 17, wherein the performing rolling updates comprises:
   determining that a first update on the first worker node has completed;
   identifying a second worker node of the one or more worker nodes on which to perform a second update;
   determining that the second worker node is performing a second read operation;
   waiting until the second read operation at the second worker node has completed; and
   performing the second update on the second worker node after the completion of the read operation at the second worker node.

20. The non-transitory computer-readable medium of claim 15, the operations further comprising:
   determining that the first worker node is an only one worker node of the one or more worker nodes, prior to determining that the software version of the coordinator node is different from the software version of the only one worker node;

activating a second worker node, wherein the coordinator node is configured to coordinate the write operations of both the first worker node and the second worker node; and updating a software of the coordinator node, wherein after the updating the software version of the coordinator node is different from the software version of both the first worker node and the second worker node.

* * * * *